US012061428B2

(12) United States Patent
Usami

(10) Patent No.: US 12,061,428 B2
(45) Date of Patent: Aug. 13, 2024

(54) TEMPERATURE CONTROL DEVICE AND IMAGE FORMING APPARATUS

(71) Applicant: TOSHIBA TEC KABUSHIKI KAISHA, Tokyo (JP)

(72) Inventor: Yutaka Usami, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/326,035

(22) Filed: May 31, 2023

(65) Prior Publication Data

US 2024/0027942 A1 Jan. 25, 2024

(30) Foreign Application Priority Data

Jul. 21, 2022 (JP) ................................ 2022-116464

(51) Int. Cl.
*G03G 15/20* (2006.01)
*G03G 15/00* (2006.01)

(52) U.S. Cl.
CPC ......... *G03G 15/2039* (2013.01); *G03G 15/20* (2013.01); *G03G 15/2003* (2013.01); *G03G 15/2014* (2013.01); *G03G 15/5004* (2013.01); *G03G 2215/20* (2013.01)

(58) Field of Classification Search
CPC ............... G03G 15/20; G03G 15/2003; G03G 15/2014; G03G 15/2039; G03G 15/5004; G03G 2215/20
See application file for complete search history.

(56) References Cited

U.S. PATENT DOCUMENTS

2020/0218183 A1* 7/2020 Shibuya ............ G03G 15/2039
2022/0187744 A1* 6/2022 Usami ............... G03G 15/5004
2022/0308509 A1* 9/2022 Wakatsu ........... G03G 15/2053

FOREIGN PATENT DOCUMENTS

JP 2013-232713 11/2013

OTHER PUBLICATIONS

Extended European Search Report for European Patent Application No. 23179671.5 dated Dec. 18, 2023.

* cited by examiner

*Primary Examiner* — Joseph S Wong
(74) *Attorney, Agent, or Firm* — Amin, Turocy & Watson, LLP

(57) ABSTRACT

According to one embodiment, the temperature control device is a temperature control device for controlling temperature of a temperature controlled target to which heat is propagated from a heater by supplying power to the heater, the device including: a temperature estimation unit; a duty generation unit; and a signal generation unit. The temperature estimation unit estimates the temperature of the temperature controlled target based on the duty value. The duty generation unit generates the duty value based on the temperature estimation result by the temperature estimation unit, the temperature detection result of the temperature controlled target by the temperature sensor, and the target temperature. The signal generation unit outputs an energization pulse for controlling the power supplied to the heater based on the duty value.

20 Claims, 11 Drawing Sheets

TEMPERATURE CONTROL DEVICE AND IMAGE FORMING APPARATUS

CROSS-REFERENCE TO RELATED APPLICATION

This application is based upon and claims the benefit of priority from Japanese Patent Application No. 2022-116464, filed on Jul. 21, 2022, the entire contents of which are incorporated herein by reference.

FIELD

Embodiments described herein relate generally to temperature control devices and image forming apparatuses.

BACKGROUND

An image forming apparatus includes a fixing device fixing a toner image on a print medium by applying heat and pressure to the print medium by the fixing device. The fixing device includes a fixing rotator (heat roller), a pressing member (press roller), a heating member (lamp or induction heating (IH) heater, or the like), and a temperature sensor. The temperature sensor detects a surface temperature of the heat roller.

A controller controlling the fixing device controls the surface temperature of the heat roller to a target value by increasing or decreasing the amount of energization power supplied to the heater based on the detection signal (temperature sensor signal) of the temperature sensor.

If a deviation (or time lag) occurs between the temperature detected by the temperature sensor and the surface temperature of the heat roller, overshoot, temperature ripple, or the like may occur. Therefore, to prevent the occurrence of the overshoot and the temperature ripple, a temperature sensor (for example, a thermopile, or the like) with good responsiveness is required. However, there is a problem in that the temperature sensor with good responsiveness has high cost.

To solve such a problem, a technique for estimating the surface temperature of the heat roller based on the energization pulse is studied. However, if a frequency of the energization pulse is high, sine temporal accuracy is required for detecting a change in the pulse, high speed sampling is essential. As a result, processing load on the processing circuit such as a central processing unit (CPU) increases.

DETAILED DESCRIPTION

A problem to be solved by embodiments is to provide a temperature control device and an image forming apparatus capable of preventing occurrence of temperature ripples while preventing an increase in processing load.

In general, according to one embodiment, a temperature control device is a temperature control device controlling temperature of a temperature controlled target to which heat is propagated from a heater by supplying power to a heater, the temperature control device including: a temperature estimation unit; a duty generation unit; and a signal generation unit. The temperature estimation unit estimates the temperature of the temperature controlled target based on a duty value. The duty generation unit generates the duty value based on a temperature estimation result by the temperature estimation unit, a temperature detection result of the temperature controlled target by a temperature sensor, and a target temperature. The signal generation unit outputs an energization pulse for controlling power supplied to the heater based on the duty value.

Hereinafter, a temperature control device and an image forming apparatus according to one embodiment will be described with reference to the drawings.

Figure 1:
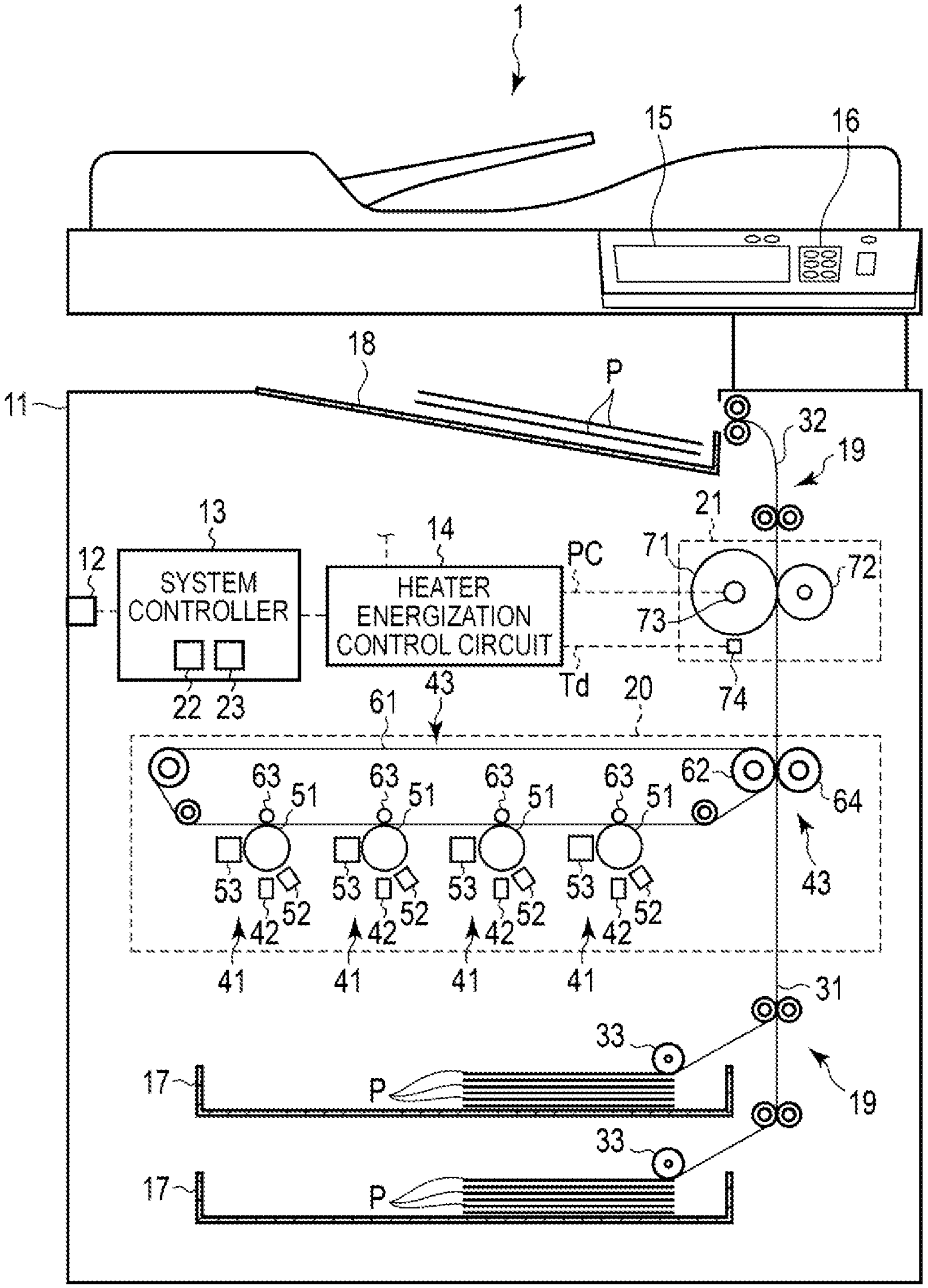
FIG. 1 is a diagram illustrating an example of a configuration of an image forming apparatus according to one embodiment.

FIG. 1 is an explanatory diagram illustrating a configuration example of an image forming apparatus 1 according to one embodiment.

The image forming apparatus 1 is, for example, a multifunction peripheral (MFP) performing various processes such as image formation while conveying a print medium P. The image forming apparatus 1 is, for example, a solid-state scanning printer (for example, a light emitting diode (LED) printer) scanning LED array performing various processes such as image formation while conveying the print medium P.

For example, the image forming apparatus 1 is configured to receive toner from a toner cartridge and form an image on the print medium P by using the received toner. The toner may be monochromatic toner or colored toner such as cyan, magenta, yellow and black. The toner may be a decolorable toner that is decolorized if heat is applied to the toner.

As illustrated in FIG. 1, the image forming apparatus 1 includes a housing 11, a communication interface 12, a system controller 13, a heater energization control circuit 14, a display unit 15, an operation interface 16, a plurality of paper trays 17, a paper discharge tray 18, a conveying unit 19, an image forming unit 20, and a fixing device 21.

The housing 11 is a main body of the image forming apparatus 1. The housing 11 accommodates the communication interface 12, the system controller 13, the heater energization control circuit 14, the display unit 15, the operation interface 16, the plurality of paper trays 17, the paper discharge tray 18, the conveying unit 19, the image forming unit 20, and the fixing device 21.

First, a configuration of the control system of the image forming apparatus 1 will be described.

The communication interface 12 is an interface for communicating with other devices. The communication interface 12 is used, for example, for communication with a host device (external device). The communication interface 12 is configured as, for example, a local area network (LAN) connector or the like. The communication interface 12 may perform wireless communication with other devices according to standards such as Bluetooth (registered trademark) or Wi-fi (registered trademark).

The system controller 13 controls the image forming apparatus 1. The system controller 13 includes, for example, a processor 22 and a memory 23.

The processor 22 is an arithmetic operation element executing arithmetic processing. The processor 22 is, for example, a CPU. The processor 22 performs various processes based on data such as programs stored in the memory 23. The processor 22 functions as a control unit capable of executing various operations by executing programs stored in the memory 23.

The processor 22 performs various information processing by executing the programs stored in the memory 23. For example, the processor 22 generates the print job based on an image acquired from an external device via communication interface 12. The processor 22 stores the generated print job in memory 23.

The print job includes image data representing an image to be formed on the print medium P. The image data may be data for forming an image on one print medium P or may be data for forming an image on a plurality of print media P. The print job includes information indicating whether the printing is color printing or monochrome printing. The print job may include information such as the number of copies to be printed (number of page sets), the number of copies to be printed per copy (number of pages), and the like.

The processor 22 generates print control information for controlling the operations of the conveying unit 19, the image forming unit 20, and the fixing device 21 based on the generated print job. The print control information includes information indicating the timing of paper feeding. The processor 22 supplies the print control information to the heater energization control circuit 14.

The processor 22 functions as a controller (engine controller) controlling the operations of the conveying unit 19 and the image forming unit 20 by executing programs stored in the memory 23. That is, the processor 22 controls conveying of the print medium P by the conveying unit 19, forming of the image on the print medium P by the image formation unit 20, and the like.

The memory 23 is a storage medium storing programs and data used in the programs. The memory 23 also functions as a working memory. That is, the memory 23 temporarily stores data being processed by the processor 22, programs executed by the processor 22, and the like.

Note that the image forming apparatus 1 may be configured to include an engine controller separately from the system controller 13. Here, the engine controller controls conveying of the print medium P by the conveying unit 19, forming of the image on the print medium P by the image formation unit 20, and the like. Here, the system controller 13 supplies information necessary for control in the engine controller to the engine controller.

The image forming apparatus 1 includes a power conversion circuit (not illustrated) that supplies DC voltage to various components within the image forming apparatus 1 by using AC voltage of an AC power supply AC.

The power conversion circuit supplies the DC voltage required for operations of the processor 22 and the memory 23 to the system controller 13. The power conversion circuit also supplies the DC voltage necessary for image formation to the image forming unit 20. The power conversion circuit supplies the DC voltage required for conveying the print medium P to the conveying unit 19. The power conversion circuit supplies the DC voltage for driving the heater of the fixing device 21 to the heater energization control circuit 14.

The heater energization control circuit 14 is a temperature control device (temperature control unit) controlling energization of the heater to the fixing device 21 described later. The heater energization control circuit 14 generates energization power PC for energizing the heater of the fixing device 21 and supplies the energization power to the heater of the fixing device 21. The detailed description of the heater energization control circuit 14 will be made later.

The display unit 15 includes a display displaying a screen according to a video signal input from the system controller 13 or a display control unit such as a graphic controller (not illustrated). For example, screens for various settings of the image forming apparatus 1 on the display of the display unit 15 are displayed.

The operation interface 16 includes an operation member. The operation interface 16 supplies an operation signal corresponding to the operation of the operation member to the system controller 13. The operation members are, for example, touch sensors, numeric keys, power keys, paper feed keys, various function keys, or keyboards. The touch sensor acquires information indicating a specified position within a certain area. The touch sensor is integrated with the display unit 15 as a touch panel and inputs a signal indicating a touched position on the screen displayed on the display unit 15 to the system controller 13.

The plurality of paper trays 17 are cassettes accommodating the print media P, respectively. The paper tray 17 is configured so that the print medium P can be supplied from the outside of the housing 11. For example, the paper tray 17 is configured to be able to be pulled out from the housing 11.

The paper discharge tray 18 is a tray supporting the print medium P discharged from the image forming apparatus 1.

Next, a configuration for conveying the print medium P of the image forming apparatus 1 will be described.

The conveying unit 19 is a mechanism for conveying the print medium P within the image forming apparatus 1. As illustrated in FIG. 1, the conveying unit 19 has a plurality of conveyance paths. For example, the conveying unit 19 includes a paper feed conveyance path 31 and a paper discharge conveyance path 32.

Each of the paper feed conveyance path 31 and the paper discharge conveyance path 32 is configured with a plurality of motors, a plurality of rollers, and a plurality of guides (not illustrated). The plurality of motors rotate shafts under the control of the system controller 13, so that the rollers interlocking with the rotation of the shafts are rotated. The plurality of rollers move the print medium P by rotating. The plurality of guides control a conveyance direction of the print medium P.

The paper feed conveyance path 31 takes in the print medium P from the paper tray 17 and supplies the taken-in print medium P to the image forming unit 20. The paper feed conveyance path 31 includes pickup rollers 33 corresponding to the respective paper trays. Each pickup roller 33 takes in the print medium P from the paper tray 17 into the paper feed conveyance path 31.

The paper discharge conveyance path 32 is a conveyance path for discharging the print medium P on which an image is formed from the housing 11. The print medium P discharged by the paper discharge conveyance path 32 is supported by the paper discharge tray 18.

Next, the image forming unit 20 will be described.

The image forming unit 20 is configured to form an image on the print medium P. Specifically, the image forming unit 20 forms an image on the print medium P based on the print job generated by the processor 22.

The image forming unit 20 includes a plurality of process units 41, a plurality of exposing devices 42, and a transfer mechanism 43. The image forming unit 20 includes the exposing device 42 for each process unit 41. Note that, since the plurality of process units 41 and the plurality of exposing devices 42 have the same configuration, one process unit 41 and one exposing device 42 will be described.

First, the process unit 41 will be described.

The process unit 41 is configured to form a toner image. For example, the plurality of process units 41 are provided for respective types of toner. For example, the plurality of process units 41 correspond to respective color toners such as cyan, magenta, yellow, and black.

Specifically, the process units 41 are connected to respective toner cartridges containing toners of different colors.

The toner cartridge includes a toner container and a toner delivery mechanism. The toner container is a container containing the toner. The toner delivery mechanism is a mechanism configured with a screw and the like for delivering the toner in the toner container.

The process unit 41 includes a photosensitive drum 51, an electrostatic charger 52, and a developer 53.

The photosensitive drum 51 is a photosensitive member including a cylindrical drum and a photosensitive layer formed on an outer peripheral surface of the drum. The photosensitive drum 51 is rotated at a constant speed by a driving mechanism (not illustrated).

The electrostatic charger 52 uniformly charges a surface of the photosensitive drum 51. For example, the electrostatic charger 52 charges the photosensitive drum 51 to a uniform negative potential (contrast potential) by applying a voltage (development bias voltage) to the photosensitive drum 51 by using a charging roller. The charging roller is rotated by rotation of the photosensitive drum 51 while applying a predetermined pressure to the photosensitive drum 51.

The developing device 53 is a device causing toner to adhere to the photosensitive drum 51. The developing device 53 includes a developer container, a stirring mechanism, a developing roller, a doctor blade, an automatic toner control (ATC) sensor, and the like.

The developer container is a container receiving and containing the toner delivered from the toner cartridge. The carriers are contained in advance in the developer container. The toner delivered from the toner cartridge is stirred with the carriers by the stirring mechanism to form the developer in which the toner and the carriers are mixed. The carriers are contained in the developer container if the developing device 53 is manufactured.

The developing roller adheres the developer to the surface of the developing roller by rotating within the developer container. The doctor blade is a member arranged at a predetermined distance from the surface of the developing roller. The doctor blade removes some of the developer adhering to the surface of the rotating developing roller. Accordingly, a developer layer having a thickness corresponding to a distance between the doctor blade and the surface of the developing roller is formed on the surface of the developing roller.

The ATC sensor is, for example, a magnetic flux sensor having a coil and detects a voltage value generated in the coil. The detected voltage of the ATC sensor changes depending on a density of the magnetic flux from the toner inside the developer container. That is, the system controller 13 determines a concentration ratio (toner concentration ratio) of the toner remaining in the developer container to the carriers based on the voltage detected by the ATC sensor. The system controller 13 operates a motor (not illustrated) driving the delivery mechanism of the toner cartridge based on the toner concentration ratio to deliver the toner from the toner cartridge to the developer container of the developing device 53.

Next, the exposing device 42 will be described.

The exposing device 42 has a plurality of light emitting elements. The exposing device 42 forms a latent image on the photosensitive drum 51 by irradiating the charged photosensitive drum 51 with light from the light emitting element. The light emitting element is, for example, a light emitting diode (LED). One light emitting element is configured to irradiate one point on the photosensitive drum 51 with light. The plurality of light emitting elements are arranged in a main scanning direction parallel to a rotation axis of the photosensitive drum 51.

The exposing device 42 forms the latent image for one line on the photosensitive drum 51 by irradiating the photosensitive drum 51 with light from the plurality of light emitting elements arranged in the main scanning direction. The exposing device 42 continuously irradiates the rotating photosensitive drum 51 with light to form the latent image of a plurality of lines.

In the above-described configuration, if the surface of the photosensitive drum 51 charged by the electrostatic charger 52 is irradiated with light from the exposing device 42, the electrostatic latent image is formed. If the developer layer formed on the surface of the developing roller approaches the surface of the photosensitive drum 51, the toner contained in the developer adheres to the latent image formed on the surface of the photosensitive drum 51. Accordingly, the toner image is formed on the surface of the photosensitive drum 51.

Next, the transfer mechanism 43 will be described.

The transfer mechanism 43 is configured to transfer the toner image formed on the surface of the photosensitive drum 51 to the print medium P.

The transfer mechanism 43 includes, for example, a primary transfer belt 61, a secondary transfer facing roller 62, a plurality of primary transfer rollers 63 and secondary transfer rollers 64.

The primary transfer belt 61 is an endless belt wound around the secondary transfer facing roller 62 and a plurality of winding rollers. The primary transfer belt 61 allows an inner surface (inner peripheral surface) to be in contact with the secondary transfer facing roller 62 and the plurality of winding rollers and allows an outer surface (outer peripheral surface) to face the photosensitive drum 51 of the process unit 41.

The secondary transfer facing roller 62 is rotated by a motor (not illustrated). The secondary transfer facing roller 62 rotates to convey the primary transfer belt 61 in a predetermined conveyance direction. The plurality of winding rollers are configured to be freely rotatable. The plurality of winding rollers rotate along with movement of the primary transfer belt 61 by the secondary transfer facing roller 62.

The plurality of primary transfer rollers 63 are configured to allow the primary transfer belt 61 to be in contact with the photosensitive drums 51 of the process unit 41. The plurality of primary transfer rollers 63 are provided to correspond to the photosensitive drums 51 of the plurality of process units 41. Specifically, the plurality of primary transfer rollers 63 are provided at positions facing the photosensitive drums 51 of the corresponding process units 41 with the primary transfer belt 61 interposed therebetween. The primary transfer roller 63 is allowed to be in contact with the inner circumferential surface of the primary transfer belt 61 and displaces the primary transfer belt 61 toward the photosensitive drum 51. Accordingly, the primary transfer roller 63 allows the outer peripheral surface of the primary transfer belt 61 to be in contact with the photosensitive drum 51.

The secondary transfer roller 64 is provided at the position facing the primary transfer belt 61. The secondary transfer roller 64 is allowed be in contact with the outer peripheral surface of the primary transfer belt 61 and applies pressure to the outer peripheral surface. Accordingly, a transfer nip is formed in which the secondary transfer roller 64 and the outer peripheral surface of the primary transfer belt 61 are in close contact with each other. If the print medium P passes through the transfer nip, the secondary transfer roller 64 presses the print medium P passing through the transfer nip against the outer peripheral surface of the primary transfer belt 61.

The secondary transfer roller 64 and the secondary transfer facing roller 62 rotate to convey the print medium P supplied from the paper feed conveyance path 31 in a sandwiched state. Accordingly, the print medium P can pass through the transfer nip.

In the above-described configuration, if the outer peripheral surface of the primary transfer belt 61 is in contact with the photosensitive drum 51, the toner image formed on the surface of the photosensitive drum is transferred to the outer peripheral surface of the primary transfer belt 61. If the image forming unit 20 includes the plurality of process units 41, the primary transfer belt 61 receives the toner images from the photosensitive drums 51 of the plurality of process units 41. The toner image transferred to the outer peripheral surface of the primary transfer belt 61 is conveyed to the transfer nip in which the secondary transfer roller 64 and the outer peripheral surface of the primary transfer belt 61 are in close contact with each other, by the primary transfer belt 61. If the print medium P exists in the transfer nip, the toner image transferred to the outer peripheral surface of the primary transfer belt 61 is transferred to the print medium P at the transfer nip.

Next, a configuration of the fixing of the image forming apparatus 1 will be described.

The fixing device 21 fixes the toner image onto the print medium P to which the toner image is transferred. The fixing device 21 operates under the control of the system controller 13 and heater energization control circuit 14. The fixing device 21 includes the fixing rotator, the pressing member, and the heating member. The fixing rotator is, for example, a heat roller 71. The heat roller 71 heats the toner image formed on the print medium P to fix the toner image on the print medium P. The pressing member is, for example, a press roller 72. The heating member is, for example, a heater 73 heating the heat roller 71. The fixing device 21 includes a temperature sensor (thermal sensor) 74 detecting the temperature of the heat roller 71.

The heat roller 71 is the fixing rotator rotated by a motor (not illustrated). The heat roller 71 has a hollow core metal and an elastic layer formed on an outer periphery of the core metal. The heat roller 71 heats an inside of the core metal by the heater 73 disposed inside the core metal formed in a hollow shape. The heat generated inside the core metal is transferred to the surface (that is, the surface of the elastic layer) of the heat roller 71 which is the outside.

The press roller 72 is provided at the position facing the heat roller 71. The press roller 72 has a core metal with a predetermined outer diameter and an elastic layer formed on an outer periphery of the core metal. The press roller 72 applies pressure to the heat roller 71 by stress applied from a tension member (not illustrated). By applying pressure from the press roller 72 to the heat roller 71, a nip (fixing nip) is formed in which the press roller 72 and the heat roller 71 are in close contact with each other. The press roller 72 is rotated by a motor (not illustrated). The press roller 72 rotates to move the print medium P entering the fixing nip and press the print medium P against the heat roller 71.

The heater 73 is a device generating heat by the energization power PC supplied from the heater energization control circuit 14. The heater 73 is, for example, a halogen heater. The heater 73 heats the inside of the core metal of the heat roller 71 by electromagnetic waves radiated from a halogen lamp heater by energizing the halogen lamp heater, which is a heat source, with the energization power PC supplied from the heater energization control circuit 14. The heater 73 may be, for example, an IH heater.

The temperature sensor 74 detects the temperature of the heat roller 71. Herein, it is described that the temperature sensor 74 detects the surface temperature of the heat roller 71. The temperature sensor 74 may detect the temperature of air near the surface of the heat roller 71. The plurality of temperature sensors 74 may be used. For example, the plurality of temperature sensors 74 may be arranged parallel to the rotation axis of the heat roller 71. Note that the temperature sensor 74 may be provided at a position where at least a change in the surface temperature of the heat roller 71 can be detected. The temperature sensor 74 supplies a temperature detection result Td of the heat roller 71 by the temperature sensor 74 to the heater energization control circuit 14. The temperature detection result Td is a surface temperature of the heat roller 71 detected by the temperature sensor 74. The temperature detection result Td may also refer to a signal indicating the surface temperature of the heat roller 71 detected by the temperature sensor 74.

With the above-described configuration, the heat roller 71 and the press roller 72 apply heat and pressure to the print medium P passing through the fixing nip. The toner on the print medium P is melted by the heat applied by the heat roller 71 and coated to the surface of the print medium P by the pressure applied by the heat roller 71 and the press roller 72. Accordingly, the toner image is fixed on the print medium P that passed through the fixing nip. The print medium P that passed through the fixing nip is introduced into the paper discharge conveyance path 32 and discharged to the paper discharge tray 18.

Next, the heater energization control circuit 14 will be described.

The heater energization control circuit 14 supplies power to the heater 73 by controlling energization to the heater 73 of the fixing device 21. The heater energization control circuit 14 controls the surface temperature of the heat roller 71 to which heat is propagated from the heater 73 by supplying power to the heater 73. The heater energization control circuit 14 generates the energization power PC for energizing the heater 73 of the fixing device 21 and supplies the energization power to the heater 73 of the fixing device 21.

Figure 2:
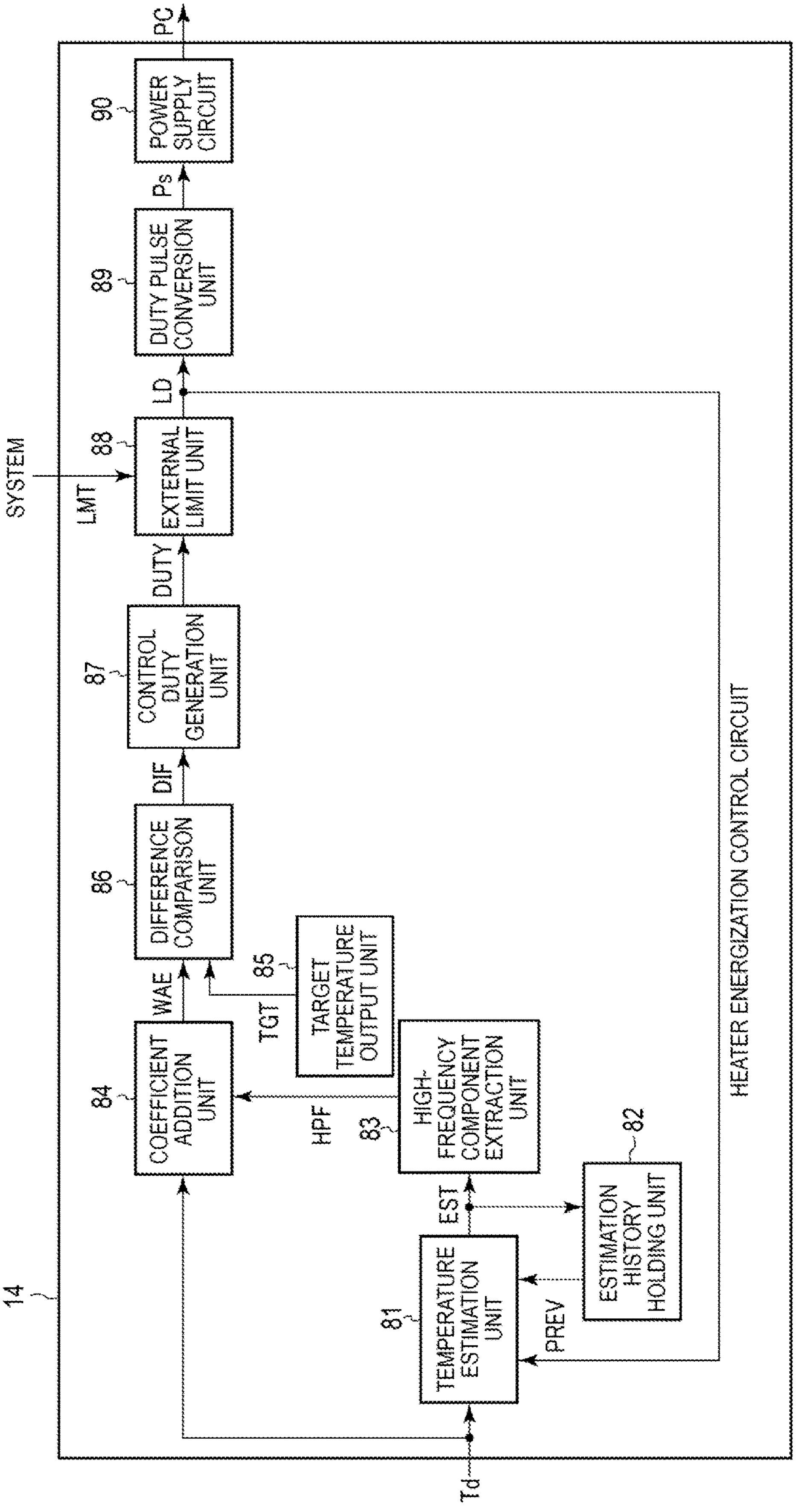
FIG. 2 is a diagram illustrating an example of a configuration of a heater energization control circuit.

As illustrated in FIG. 2, the heater energization control circuit 14 includes a temperature estimation unit 81, an estimation history holding unit 82, a high frequency component extraction unit 83, a coefficient addition unit 84, a target temperature output unit 85, a difference comparison unit 86, a control duty generation unit 87, an external limit unit 88, a duty pulse conversion unit 89, and a power supply circuit 90. The temperature detection result Td from the temperature sensor 74 is input to the heater energization control circuit 14.

The temperature estimation unit 81 performs a temperature estimation process for estimating the surface temperature of the heat roller 71. The temperature detection result Td from the temperature sensor 74, an estimation history PREV from the estimation history holding unit 82, and a duty value LD from the external limit unit 88 are input to the temperature estimation unit 81.

The estimation history PREV is a history of a temperature estimation result EST by the temperature estimation unit 81. The estimation history PREV may also refer to a signal indicating the history of the temperature estimation result EST by the temperature estimation unit 81. The history of the temperature estimation results EST by the temperature estimation unit 81 includes the plurality of past temperature estimation results EST. The temperature estimation result EST is the surface temperature of the heat roller 71 estimated based on at least the duty value LD by the temperature estimation unit 81. The temperature estimation result EST may also refer to a signal indicating the surface temperature of the heat roller 71 estimated based on at least the duty value LD by the temperature estimation unit 81.

The duty value LD is a duty value based on the duty value DUTY. The duty value LD may also refer to a signal indicating the duty value based on the duty value DUTY. The duty value LD may have the same value as the duty value DUTY or may be different from the duty value DUTY. If the external limit unit 88 does not limit the duty value DUTY, the duty value LD is the same duty value as the duty value DUTY. If the external limit unit 88 limits the duty value DUTY, the duty value LD is a duty value after limitation by the external limit unit 88 and is different from the duty value DUTY.

The duty value DUTY is a duty value generated by the control duty generation unit 87. The duty value DUTY may also refer to a signal indicating the duty value generated by the control duty generation unit 87.

The temperature estimation unit 81 estimates the surface temperature of the heat roller 71 based on the duty value LD and generates the temperature estimation result EST. The temperature estimation unit 81 outputs the temperature estimation result EST to the estimation history holding unit 82 and the high frequency component extraction unit 83. As described above, the duty value LD is a duty value based on the duty value DUTY. Therefore, estimating the surface temperature of the heat roller 71 based on the duty value LD is an example of estimating the surface temperature of the heat roller 71 based on the duty value DUTY. As described above, the duty value LD may be a duty value after limitation by the external limit unit 88. Therefore, estimating the surface temperature of the heat roller 71 based on the duty value LD includes estimating the surface temperature of the heat roller 71 based on the duty value after limitation by external limit unit 88.

In a typical example, the temperature estimation unit 81 estimates the surface temperature of the heat roller 71 based on the estimation history PREV and the duty value LD and generates the temperature estimation result EST. Estimating the surface temperature of the heat roller 71 based on the estimation history PREV and the duty value LD is an example of estimating the surface temperature of the heat roller 71 based on the estimation history PREV and the duty value DUTY. Estimating the surface temperature of the heat roller 71 based on the estimation history PREV and the duty value LD includes estimating the surface temperature of the heat roller 71 based on the estimation history PREV and the duty value after the limitation by the external limit unit 88.

The estimation history holding unit 82 holds the estimation history PREV. The estimation history holding unit 82 outputs the estimation history PREV to the temperature estimation unit 81.

The high frequency component extraction unit 83 performs a high pass filter process for extracting high frequency components of the temperature estimation result EST. For example, the high frequency component extraction unit 83 cancels the DC component in the temperature estimation result EST and extracts only the high frequency component. The high frequency component extraction unit 83 generates a high frequency component HPF and outputs the high frequency component HPF to the coefficient addition unit 84. The high frequency component HPF is a high frequency component of the temperature estimation result EST extracted by the high frequency component extraction unit 83. The high frequency component HPF may also refer to a signal indicating the high frequency component of the temperature estimation result EST extracted by the high frequency component extraction unit 83.

The coefficient addition unit 84 performs a coefficient addition process for correcting the temperature detection result Td. The temperature detection result Td from the temperature sensor 74 and the high frequency component HPF from the high frequency component extraction unit 83 are input to the coefficient addition unit 84. The coefficient addition unit 84 corrects the temperature detection result Td based on the high frequency component HPF to generate a corrected temperature value WAE. The corrected temperature value WAE is a value obtained by correcting the temperature detection result Td based on the high frequency component HPF and is the estimated surface temperature of the heat roller 71. The corrected temperature value WAE may also refer to a signal indicating the value obtained by correcting the temperature detection result Td based on the high frequency component HPF. The coefficient addition unit 84 outputs the corrected temperature value WAE to the difference comparison unit 86.

Specifically, the coefficient addition unit 84 multiplies the high frequency component HPF and a preset coefficient K. The coefficient addition unit 84 adds the value obtained by multiplying the high frequency component HPF and the coefficient K to the temperature detection result Td. The coefficient addition unit 84 obtains a value obtained by (Td+K*HPF) as the corrected temperature value WAE. Since the high frequency component HPF is based on the temperature estimation result EST, it can be said that the corrected temperature value WAE is based on the temperature estimation result EST and the temperature detection result Td. The coefficient addition unit 84 is an example of an arithmetic unit obtaining corrected temperature value WAE.

For example, if the coefficient K is 1, the coefficient addition unit 84 directly adds the high frequency component HPF to the temperature detection result Td. For example, if the coefficient K is 0.1, the coefficient addition unit 84 adds a value of 1/10 of the high frequency component HPF to the temperature detection result Td. Here, the effect of the high frequency component HPF is almost lost, and the temperature detection result becomes close to the temperature detection result Td. For example, if the coefficient K is 1 or more, the effect of the high frequency component HPF can be expressed more strongly. According to experiments, it is reported that the coefficient K set in the coefficient addition unit 84 is not a very extreme value, but a value in the vicinity of 1 is good.

The target temperature output unit 85 performs an output process for outputting a preset target temperature TGT to the difference comparison unit 86. The target temperature TGT is a target value of the surface temperature of the heat roller 71. The target temperature TGT may also refer to a signal indicating the target value of the surface temperature of the heat roller 71. The target temperature TGT can be changed by rewriting according to an instruction from the processor 22. The target value of the surface temperature of the heat roller 71 may be stored in memory 23.

For example, the target temperature TGT is set for each printing process.

In one example, the target temperature TGT varies depending on a quality of the print media P used in each printing process. For example, the quality is thickness. In general, the target temperature TGT is determined to maintain a predetermined temperature if the print medium P is plain paper. If the print medium P passes through the fixing device 21, the amount of heat taken from the heat roller 71 by the print medium P in the case of the thick paper is increased to be larger than that in the case of the plain paper. The surface temperature of the heat roller 71 in the case of printing on the thick paper is more likely to be lowered than that in the case of printing on the plain paper. If the print medium P is the thick paper, the target temperature TGT is higher than the target temperature TGT associated with the plain paper, taking into consideration the amount of heat taken from the heat roller 71 by the thick paper. Accordingly, the surface temperature of the heat roller 71 can be easily maintained at a predetermined temperature. If the print medium P is thinner than the plain paper, the target temperature TGT is lower than the target temperature TGT associated with the plain paper.

In another example, the target temperature TGT varies depending on the status of the printing process. The example of the target temperature TGT according to the status of the printing process will be described later.

The difference comparison unit 86 performs a difference calculation process. The correction temperature value WAE from the coefficient addition unit 84 and the target temperature TGT from the target temperature output unit 85 are input to the difference comparison unit 86. The difference comparison unit 86 compares the target temperature TGT and the corrected temperature value WAE. The difference comparison unit 86 calculates a difference DIF based on the comparison between the target temperature TGT and the corrected temperature value WAE. The difference DIF is a difference between the target temperature TGT and the corrected temperature value WAE. The difference DIF may also refer to a signal indicating the difference between the target temperature TGT and the corrected temperature value WAE. The difference comparison unit 86 outputs the difference DIF to the control duty generation unit 87. The difference comparison unit 86 is an example of the comparison unit.

Herein, although the difference DIF is a value obtained by subtracting the target temperature TGT from the corrected temperature value WAE, but the reverse may also be available. In the present example, the difference DIF is a negative value if the corrected temperature value WAE is lower than the target temperature TGT. If the corrected temperature value WAE is higher than the target temperature TGT, the difference DIF is a positive value. The difference DIF indicates the relationship between the target temperature TGT and the corrected temperature value WAE.

The control duty generation unit 87 performs a duty value generation process for generating the duty value DUTY. The difference DIF from the difference comparison unit 86 is input to the control duty generation unit 87. The control duty generation unit 87 generates the duty value DUTY based on the difference DIF. The duty value DUTY is a duty value corresponding to the difference DIF. If the corrected temperature value WAE is equal to the target temperature TGT, the duty value DUTY is a center value (reference value) of the duty. If the corrected temperature value WAE is lower than the target temperature TGT, the control duty generation unit 87 increases the duty value from the center value of the duty to increase the amount of energization power supplied to the heater 73. The duty value DUTY is a value higher than the center value of the duty. On the other hand, if the corrected temperature value WAE is higher than the target temperature TGT, the control duty generation unit 87 decreases the duty value from the center value of the duty to decrease the amount of energization power supplied to the heater 73. The duty value DUTY is a value lower than the center value of the duty. The duty value DUTY is a real number. For example, the duty value may have a resolution of 0 to 100. The control duty generation unit 87 outputs the duty value DUTY to the external limit unit 88. The control duty generation unit 87 is an example of the duty generation unit.

As described above, it can be said that the corrected temperature value WAE is based on the temperature estimation result EST and the temperature detection result Td. The difference DIF is a difference between the target temperature TGT and the corrected temperature value WAE. Therefore, generating the duty value DUTY based on the difference DIF includes generating the duty value based on the temperature estimation result EST, the temperature detection result Td, and the target temperature TGT.

The external limit unit 88 performs limit processing to limit the duty value DUTY. System protection information LMT from the processor 22 and the duty value DUTY from the control duty generation unit 87 are input to the external limit unit 88. The external limit unit 88 reflects system protection information LMT on the duty value DUTY and generates the duty value LD based on the duty value DUTY. Reflecting the system protection information LMT on the duty value DUTY includes applying the system protection information LMT to the duty value DUTY. If the duty value DUTY does not satisfy the limit indicated by the system protection information LMT, the external limit unit 88 limits the duty value DUTY by reflecting the system protection information LMT on the duty value DUTY. If the duty value DUTY satisfies the limit indicated by the system protection information LMT, the external limit unit 88 does not limit the duty value DUTY even by reflecting the system protection information LMT on the duty value DUTY. The external limit unit 88 outputs the duty value LD to the temperature estimation unit 81 and the duty pulse conversion unit 89. The external limit unit 88 is an example of the limit unit.

The system protection information LMT is information for limiting the duty value to protect the image forming apparatus 1. The system protection information LMT may also refer to a signal indicating information for limiting the duty value to protect the image forming apparatus 1. The system protection information LMT can be changed by an instruction from the processor 22.

In one example, the system protection information LMT is information on at least one of the upper limit value and the lower limit value of the duty value. The upper limit of the duty value is a value determined based on the power or current that can be supplied to the heater 73. The lower limit of the duty value can be set freely. If the duty value DUTY exceeds the upper limit of the duty value, the duty value DUTY does not satisfy the limit indicated by the system protection information LMT. If the duty value DUTY is smaller than the lower limit of the duty value, the duty value DUTY does not satisfy the limit indicated by the system protection information LMT. If the duty value DUTY is the lower limit value or more and the upper limit value or less of the duty value, the duty value DUTY satisfies the limit indicated by the system protection information LMT.

For example, the upper limit of the duty value is assumed to be 85, and the lower limit is assumed to be 0. A case where the duty value DUTY is 90 will be described. Since the duty value DUTY exceeds the upper limit of the duty value, the duty value DUTY does not satisfy the limit indicated by the system protection information LMT. The external limit unit 88 limits the duty value DUTY by reflecting the system protection information LMT on the duty value DUTY. The external limit unit 88 generates the duty value LD based on the duty value DUTY. The duty value LD is a duty value after limitation. The duty value after limitation is 85 corresponding to the upper limit of the duty value. A case where the duty value DUTY is 80 will be described. Since the duty value DUTY is the lower limit value or more and the upper limit value or less of the duty value, the duty value DUTY satisfies the limit indicated by the system protection information LMT. The external limit unit 88 does not limit the duty value DUTY even if the duty value DUTY reflects the system protection information LMT. The external limit unit 88 generates the duty value LD based on the duty value DUTY. The duty value LD is 80, which is the same as the duty value DUTY.

In another example, the system protection information LMT is information instructing to stop the image forming apparatus 1 to avoid danger. If the duty value DUTY is a value other than 0, the duty value DUTY does not satisfy the limit indicated by the system protection information LMT. Here, the external limit unit 88 limits the duty value DUTY by reflecting the system protection information LMT on the duty value DUTY. The external limit unit 88 generates the duty value LD based on the duty value DUTY. The duty value LD is a duty value after limitation. The duty value after limitation is 0. If the duty value DUTY is 0, the duty value DUTY satisfies the limit indicated by the system protection information LMT. Here, the external limit unit 88 does not limit the duty value DUTY even if the external limit unit reflects the system protection information LMT on the duty value DUTY. The external limit unit 88 generates the duty value LD based on the duty value DUTY. The duty value LD is 0, which is the same as the duty value DUTY.

The duty pulse conversion unit 89 performs a generation process for generating an energization pulse Ps for controlling the power supplied to the heater 73 based on the duty value LD. The energization pulse Ps is a pulse signal for controlling the power supplied to the heater 73. The energization pulse Ps is a gate signal of a triac. The duty value LD from the external limit unit 88 is input to the duty pulse conversion unit 89. The duty pulse conversion unit 89 converts the duty value LD into an energization pulse train. The duty pulse conversion unit 89 generates the energization pulse Ps constituting the energization pulse train. The duty pulse conversion unit 89 outputs the energization pulse Ps to the power supply circuit 90. The duty pulse conversion unit 89 is an example of the signal generation unit generating the energization pulse Ps.

As described above, the duty value LD may be a duty value after limitation by the external limit unit 88. Therefore, generating and outputting the energization pulse Ps based on the duty value LD includes generating and outputting the energization pulse Ps based on the duty value after limitation by the external limit unit 88. The generating and outputting the energization pulse Ps based on the duty value LD is an example of generating and outputting the energization pulse Ps based on the duty value DUTY.

The duty pulse conversion unit 89 may select a duty pattern based on the duty value LD and generate the energization pulse Ps according to the selected duty pattern. The duty pattern is a pattern corresponding to the duty value. The duty pattern indicates the energization pulse train configured with a value of “0” or “1” values aligned according to the duty value. “1” indicates a conduction (ON) signal. “0” indicates a cutoff (OFF) signal. The number of the value “1” varies depending on the duty value. The duty pattern may be stored in the memory 23.

The duty pulse conversion unit 89 may generate the energization pulse Ps in asynchronization with the system operation. Specifically, the duty pulse conversion unit 89 may adjust a pulse frequency and an issuing time of the energization pulse Ps according to the AC voltage frequency of 50 Hz/60 Hz. The duty pulse conversion unit 89 acquires an AC voltage phase and performs a synchronous output process of outputting the energization pulse Ps constituting the energization pulse train in synchronization with the AC voltage based on the AC voltage phase. The duty pulse conversion unit 89 outputs the energization pulse Ps in synchronization with zero crossing of the AC voltage.

The power supply circuit 90 supplies the energization power PC to the heater 73 based on the energization pulse Ps. The power supply circuit 90 energizes the heater 73 of the fixing device 21 by using an AC voltage supplied from an AC voltage source (not illustrated). The power supply circuit 90 supplies the energization power PC to the heater 73 by, for example, switching between the state in which the AC voltage from the AC voltage source is supplied to the heater 73 and the state in which the AC voltage is not supplied, based on the energization pulse Ps. That is, the power supply circuit 90 changes an energization time for the heater 73 of the fixing device 21 according to the energization pulse Ps.

Note that the power supply circuit 90 may be configured integrally with the fixing device 21. That is, the heater energization control circuit 14 may be configured to supply the energization pulse Ps to the power supply circuit of the heater 73 of the fixing device 21 instead of supplying the energization power PC to the heater 73.

As described above, the heater energization control circuit 14 adjusts the amount of power supplied to the heater 73 of the fixing device 21. Accordingly, the heater energization control circuit 14 controls the surface temperature of the heat roller 71 heated by the heater 73. Such control is referred to herein as weighted average control with estimate temperature (WAE control).

Note that each of the temperature estimation unit 81, the estimation history holding unit 82, the high frequency component extraction unit 83, the coefficient addition unit 84, the target temperature output unit 85, the difference comparison unit 86, the control duty generation unit 87, and the external limit unit 88, and duty pulse conversion unit 89 of the heater energization control circuit 14 may be configured with an electric circuit or may be configured by software. When configured by software, the above-mentioned components may be realized by executing a program stored in the memory by the processor 22 or a processor different from the processor 22. The processor is, for example, a processing circuit such as a CPU.

The thermal circuit representing heat transfer for obtaining the temperature estimation result EST will be described.

Figure 3:
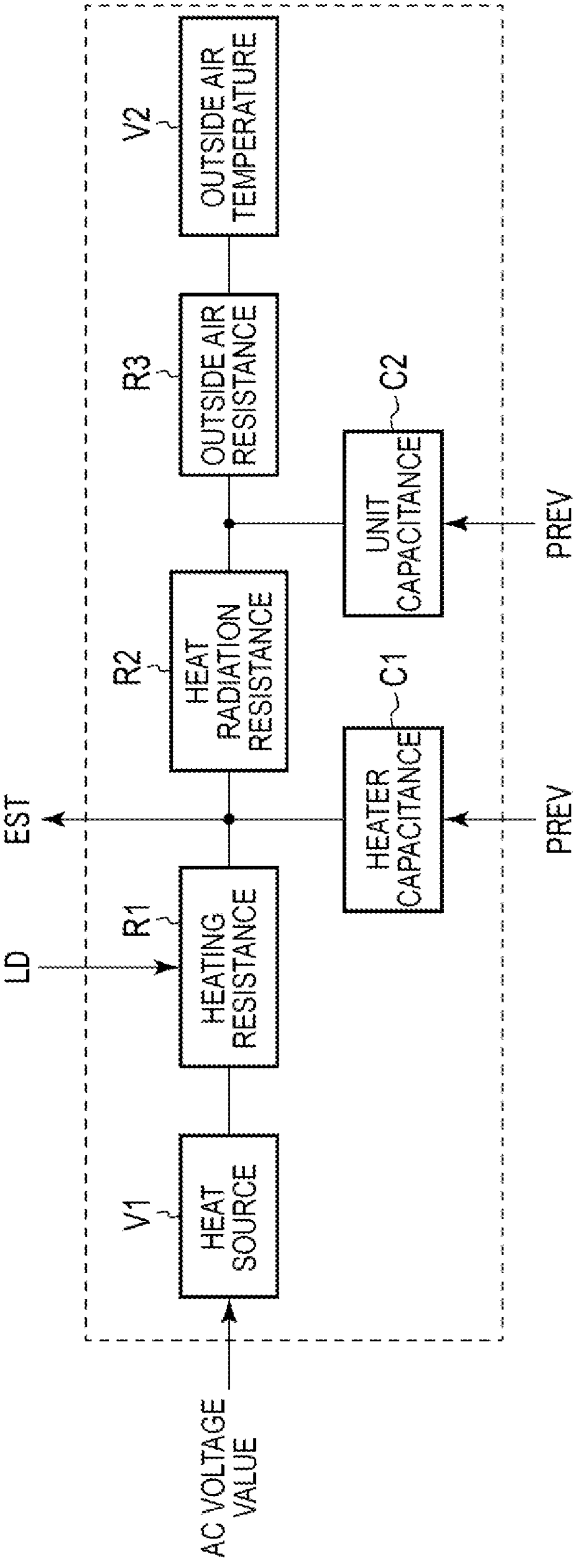
FIG. 3 is a diagram illustrating a thermal circuit representing heat transfer for obtaining a temperature estimation result.

FIG. 3 is a diagram illustrating the thermal circuit representing the heat transfer for obtaining the temperature estimation result EST.

The heat transfer can be represented by the thermal circuit equivalent to a CR time constant (C is capacitance, and R is resistance) of an electric circuit. The thermal circuit is configured with V, C, and R elements.

A heat source V1 is equivalent to a DC voltage source in the electrical circuit. A heating resistance R1 is equivalent to a variable resistance in the electrical circuit. The heating resistance R1 uses the duty value LD as a variable factor. For example, if the duty value indicated by the duty value LD is 100%, the heating resistance R1 is assumed to remain at R. Herein, for example, R is assumed to be 100 Ω. If the duty value indicated by the duty value LD is 0%, the heating resistance Ra is assumed to be 100 Ω*10,000,000 (extremely large value). If the duty value indicated by the duty value LD is larger than 0 and smaller than 100, the heating resistance R1 is assumed to be 100 Ω*(duty value LD/100). A heater capacitance C1 together with the heating resistance R1 forms a first CR time constant circuit. The heater capacitance C1 is updated to the temperature at the current time by referring to the estimation history PREV before a minute time dt.

A heat dissipation resistance R2 is a resistance value if heat escapes from the heat roller 71 to a space inside the fixing device 21. A unit capacitance C2 together with the heat dissipation resistance R2 forms a second CR time constant circuit. The unit capacitance C2 is updated to the temperature at the current time by referring to the estimation history PREV before dt.

An outside air resistance R3 is a resistance value of a path through which heat escapes from the space (outside of the heat roller 71) inside the fixing device 21 to the outside air. An outside air temperature V2 is equivalent to the DC voltage source in the electrical circuit. A relationship between the heat source V1 and the outside air temperature V2 is that heat source V1≥outside air temperature V2. Specifically, the relationship between the heat source V1 and the outside air temperature V2 before startup is heat source V1=outside air temperature V2, and the relationship between the heat source V1 and the outside air temperature V2 during the operation is heat source V1>outside air temperature V2.

For example, the temperature estimation unit 81 performs real-time simulation of the thermal circuit as described above by using the law of energy conservation based on the estimation history PREV and the duty value LD. The temperature estimation unit 81 derives a C1 voltage (temperature) as an estimation of the surface temperature of the heat roller 71 by real-time simulation of the thermal circuit. The temperature estimation unit 81 generates the C1 voltage (temperature) as the temperature estimation result EST at the current time.

Hereinafter, the WAE control will be described in detail.

Figure 4:
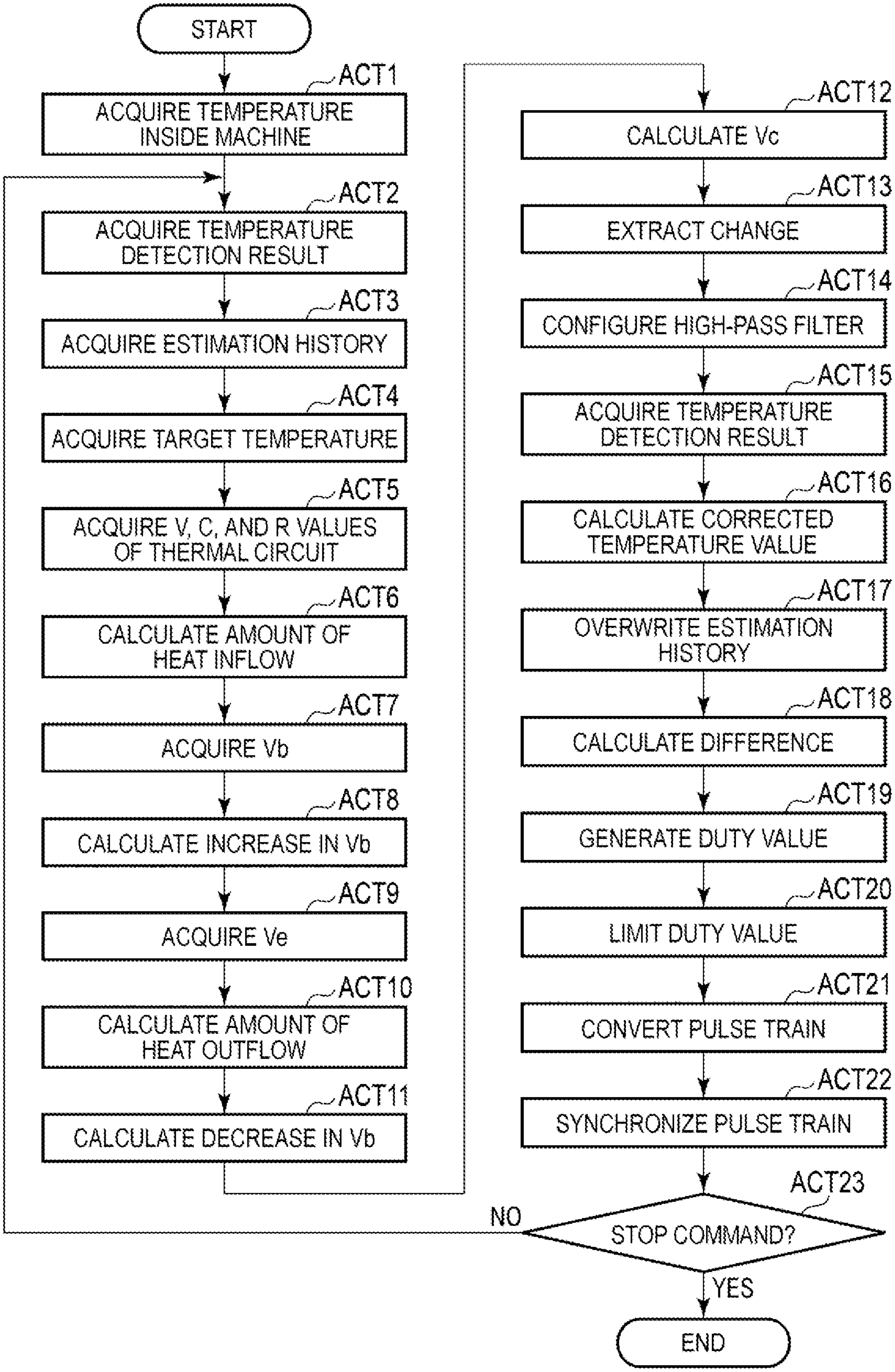
FIG. 4 is a diagram illustrating an example of an operation of the heater energization control circuit.
Figure 5:
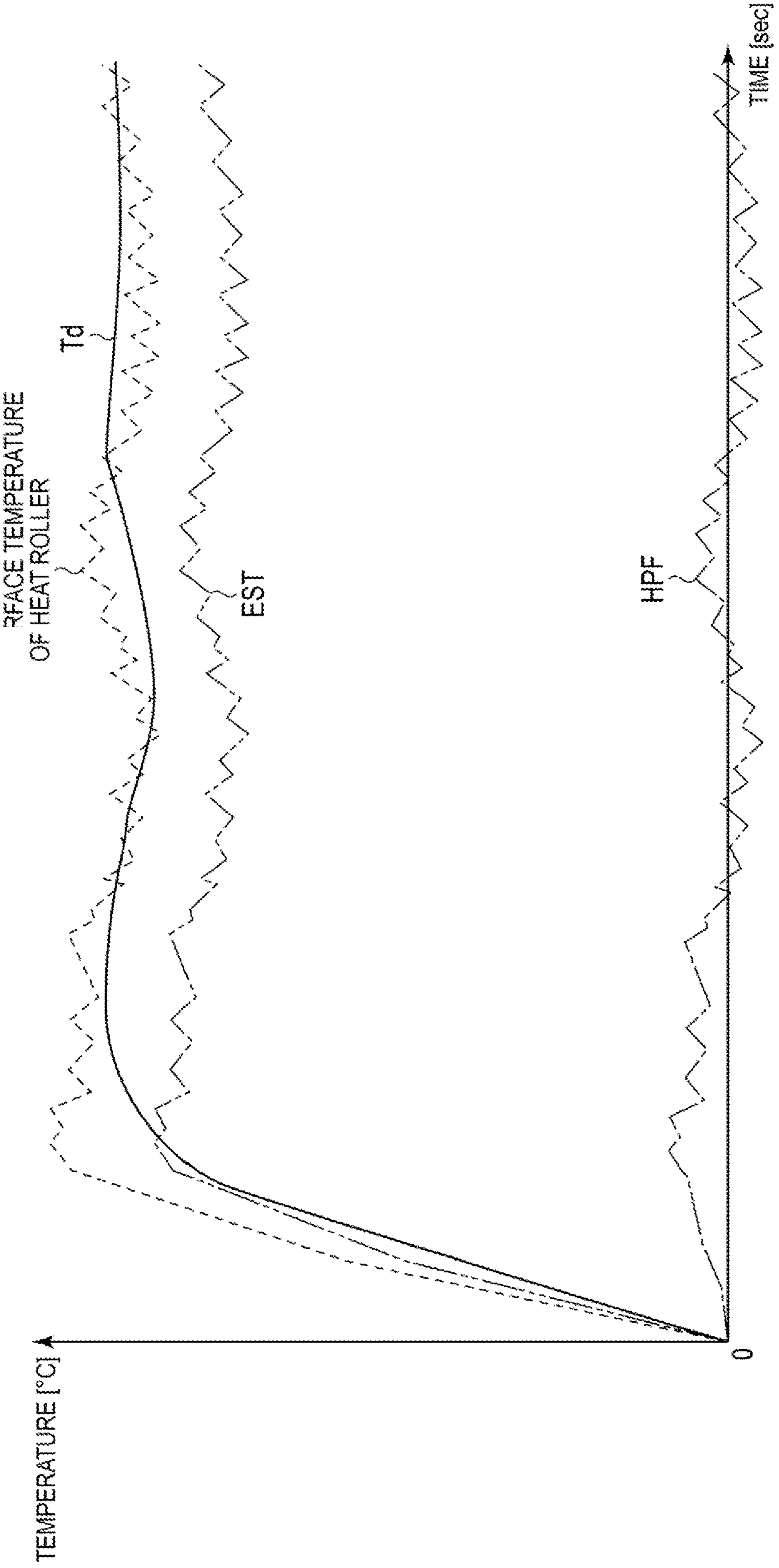
FIG. 5 is a diagram illustrating an example of an operation of the heater energization control circuit.
Figure 6:
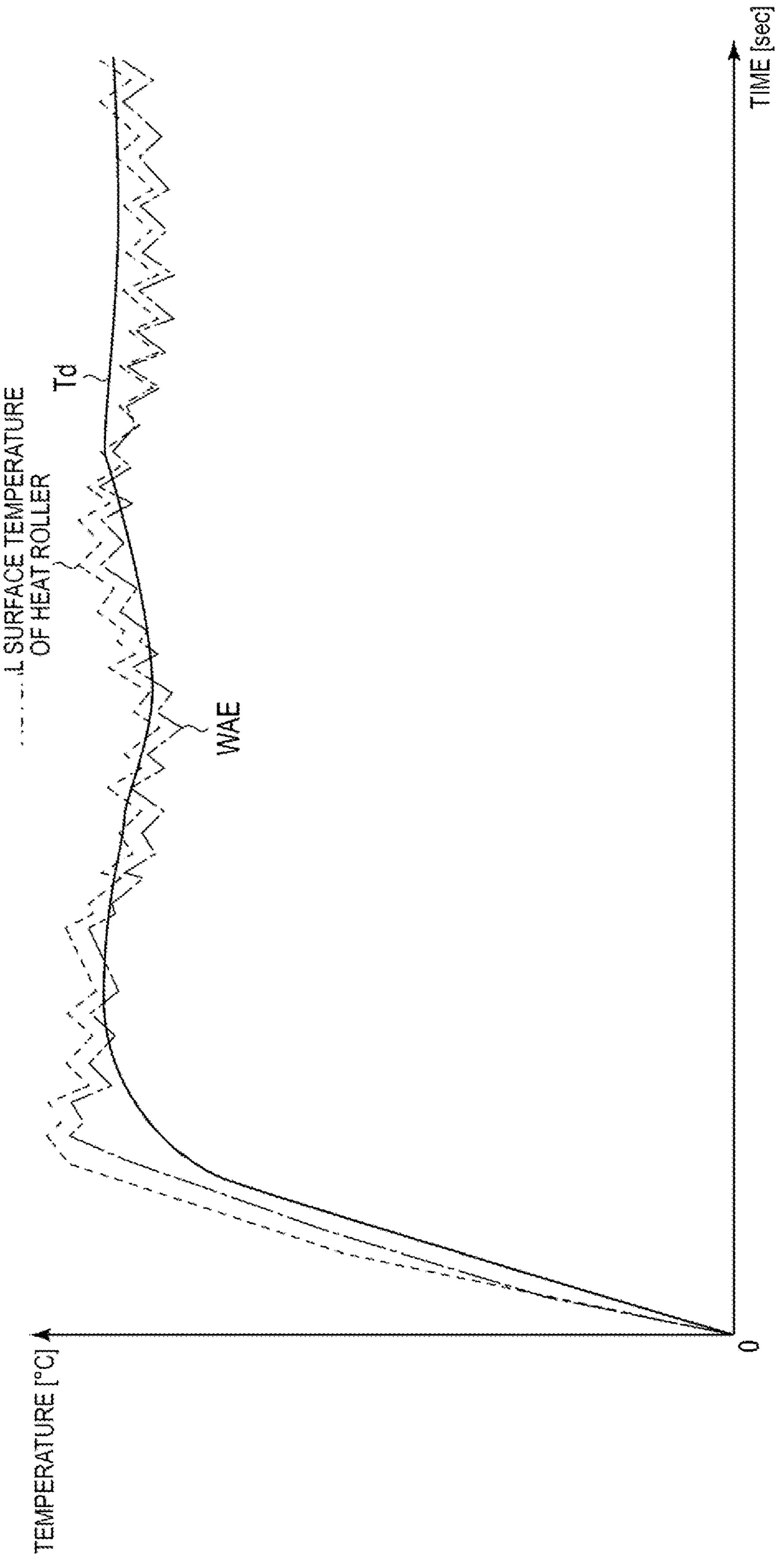
FIG. 6 is a diagram illustrating an example of an operation of the heater energization control circuit.
Figure 7:
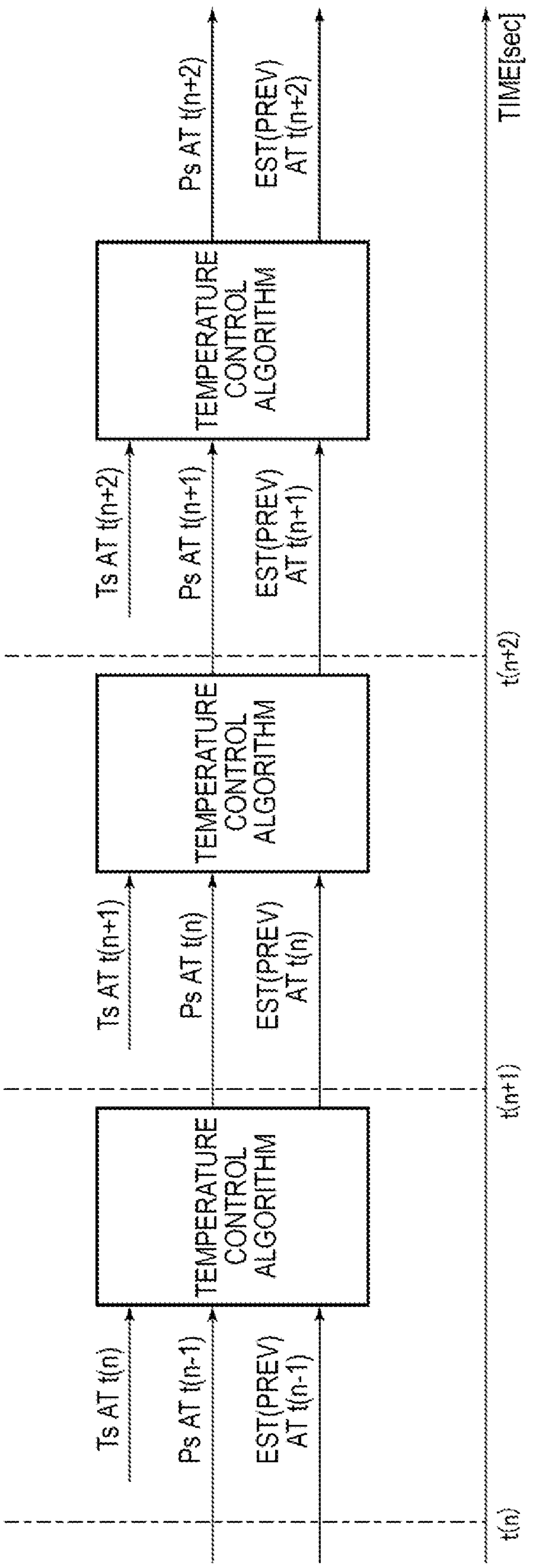
FIG. 7 is a diagram illustrating an example of an operation of the heater energization control circuit.

FIG. 4 is a flowchart illustrating the WAE control. FIGS. 5 and 6 are explanatory diagrams illustrating each signal and the like in the WAE control. The horizontal axes in FIGS. 5 and 6 indicate time. The vertical axes in FIGS. 5 and 6 indicate temperature.

The heater energization control circuit 14 acquires an internal body temperature of the image forming apparatus 1 (ACT1). Note that, since the internal body temperature changes slowly, the frequency of obtaining the internal body temperature by the heater energization control circuit 14 may be low.

The heater energization control circuit 14 acquires the current temperature detection result Td from the temperature sensor 74 (ACT2).

As illustrated in FIG. 5, there is a difference between the temperature detection result Td and an actual surface temperature of the heat roller 71. Since the surface temperature of the heat roller 71 is intermittently heated by the heater 73, the surface temperature changes in short cycles. On the other hand, the temperature sensor 74 may have poor responsiveness to temperature changes due to the own heat capacitance of the temperature sensor itself and characteristics of a temperature-sensitive material. In particular, cheaper temperature sensors tend to have poorer responsiveness. As a result, the temperature detection result Td cannot accurately follow the actual surface temperature of the heat roller 71. That is, the temperature detection result Td is detected by the temperature sensor 74 after being delayed with respect to the surface temperature of the heat roller 71. The temperature detection result Td is detected by the temperature sensor 74 in a smoothed state without reproducing a fine change in the surface temperature of the heat roller 71.

The temperature estimation unit 81 acquires the estimation history PREV before dt from the estimation history holding unit 82 (ACT3).

The difference comparison unit 86 acquires the target temperature TGT from the target temperature output unit 85 (ACT4).

The temperature estimation unit 81 acquires parameters corresponding to the V, C, and R elements constituting the thermal circuit described above (ACT5).

The temperature estimation unit 81 calculates an amount of heat inflow (ACT6). In ACT6, for example, the temperature estimation unit 81 calculates the amount of heat inflow based on V1 and R on the input side and the duty value LD. The amount of heat inflow can be calculated by I=R/V1*(100/duty value LD). If the duty value indicated by the duty value LD is 0%, the heating resistance R1 is ∞, and thus, the heat inflow from the input side is zero. On the other hand, if the duty value indicated by the duty value LD is 100%, it is I=R/V1, and the heat inflow from the input side becomes largest.

The temperature estimation unit 81 acquires Vb, which is a value corresponding to the surface temperature of the heat roller 71, from the acquired estimation history PREV (ACT7).

The temperature estimation unit 81 calculates an increase in Vb after dt due to the heat inflow from the law of energy conservation (ACT8).

The temperature estimation unit 81 acquires Ve, which is equivalent to the temperature inside the housing of the image forming apparatus 1, from the acquired estimation history PREV (ACT9).

The temperature estimation unit 81 calculates an amount of heat outflow (ACT10). In ACT10, for example, the temperature estimation unit 81 calculates a temperature difference (Vb-Ve) between the surface temperature of the heat roller 71 and the temperature inside the housing. The temperature estimation unit 81 calculates the amount of heat outflow defined by the heat dissipation resistance R2 with respect to the temperature difference (Vb-Ve).

The temperature estimation unit 81 calculates a Vb drop after dt due to the heat outflow from the law of energy conservation (ACT11).

The temperature estimation unit 81 calculates Vc after dt (ACT11). Vc after dt corresponds to the temperature estimation result EST. In ACT11, for example, the temperature estimation unit 81 calculates Vc after dt by Vc=history value of Vc+increase of Vb−decrease of Vb. The history value of Vc is a value of Vc before dt. In other words, Vc after dt is a value obtained by adding the value obtained by subtracting the decrease of Vb from the increase of Vb to the value of Vc before dt.

As illustrated in FIG. 5, the temperature estimation result EST appropriately follows a change in the actual surface temperature of the heat roller 71. However, since the temperature estimation result EST is a simulation result, there is a possibility that the absolute value may differ from the actual surface temperature of the heat roller due to the differences in conditions or the like.

The high frequency component extraction unit 83 differentiates Vc corresponding to the temperature estimation result EST in time and extracts the change (ACT12).

The high frequency component extraction unit 83 integrates the differential value and configures a high pass filter (ACT13). The high frequency component extraction unit 83 cancels DC components in the temperature estimation result EST by using the high pass filter and extracts only the high frequency component. The high frequency component extraction unit 83 generates the high frequency component HPF.

As illustrated in FIG. 5, the high frequency component HPF appropriately follows a change in the actual surface temperature of the heat roller 71.

The coefficient addition unit 84 acquires the temperature detection result Td at the current time from the temperature sensor 74 (ACT15).

The coefficient addition unit 84 calculates the corrected temperature value WAE (ACT16). In ACT16, for example, the coefficient addition unit 84 obtains the value obtained by (Td+K*HPF) as the corrected temperature value WAE.

FIG. 6 is an explanatory diagram illustrating an example of the actual surface temperature of the heat roller 71, the temperature detection result Td, and the corrected temperature value WAE. In the WAE control, a minute change in the surface temperature of the heat roller 71 is estimated based on the temperature detection result Td and the high frequency component HPF of the temperature estimation result EST. Therefore, as illustrated in FIG. 6, the corrected temperature value WAE is a value appropriately following the surface temperature of the heat roller 71.

The estimation history holding unit 82 overwrites the estimation history PREV with the temperature estimation result EST (ACT17).

The difference comparison unit 86 calculates the difference DIF based on the comparison between the target temperature TGT and the corrected temperature value WAE (ACT18).

The control duty generation unit 87 generates the duty value DUTY based on the difference DIF (ACT19).

The external limit unit 88 reflects the system protection information LMT on the duty value DUTY to limit the duty value (ACT20). In ACT20, for example, the external limit unit 88 generates the duty value LD based on the duty value DUTY by reflecting the system protection information LMT on the duty value DUTY.

The duty pulse conversion unit 89 converts the duty value LD into the energization pulse train (ACT21). The duty pulse conversion unit 89 generates the energization pulse Ps constituting the energization pulse train.

The duty pulse conversion unit 89 outputs the energization pulse Ps constituting the energization pulse train in synchronization with the AC voltage (ACT22).

The processor 22 of the system controller 13 determines whether the processor received a WAE control stop command (ACT23). If the processor 22 did not receive the WAE control stop command, the process transitions from ACT23 to ACT2. If the processor 22 received the WAE control stop command, the processor ends the process.

As described above, when performing processing of a certain cycle (corresponding cycle), the heater energization control circuit 14 performs the WAE control based on values (duty value LD and temperature estimation result EST: estimation history PREV) in the previous cycle and the temperature detection result Ts in the corresponding cycle. That is, the heater energization control circuit 14 inherits the value in the next cycle. The heater energization control circuit 14 recalculates the temperature estimation calculation based on the history of the previous calculation. Therefore, the heater energization control circuit 14 is always performing calculations during the operation. In the heater energization control circuit 14, the calculation result is stored in the memory or the like and reused in the calculation of the next cycle.

FIG. 6 is an explanatory diagram illustrating a cycle of the processing in the heater energization control circuit 14. The horizontal axis of FIG. 6 indicates time. For example, the temperature estimation unit 81 performs the temperature estimation process at time t(n), performs the next temperature estimation process at t(n+1) after the time advanced by dt, and performs the temperature estimation process at t(n+2) after the time further advanced by dt. Thus, the temperature estimation unit 81 repeatedly performs the temperature estimation process. The temperature estimation unit 81 uses the previous temperature estimation result EST for new temperature estimation in the temperature estimation process each cycle.

At time t(n), the temperature detection result Td at time t(n), the duty value LD at time t(n−1) in the previous time, and the temperature estimation result EST (estimation history PREV) at time t(n−1) in the previous time are used. The temperature estimation unit 81 performs processing based on the input signal and outputs the temperature estimation result EST at time t(n). The high frequency component extraction unit 83, the coefficient addition unit 84, the target temperature output unit 85, the difference comparison unit 86, the control duty generation unit 87, the external limit unit 88, and the duty pulse conversion unit 89 perform processing based on the input signals, and the duty pulse conversion unit 89 outputs the energization pulse Ps at the time t (n).

At time t(n+1), the temperature detection result Td newly detected at time t(n+1), the duty value LD at time t(n), and the estimation history PREV which is the temperature estimation result EST at time t(n) are used. The temperature estimation unit 81 performs processing based on the input signal and outputs the temperature estimation result EST at time t(n+1). The high frequency component extraction unit 83, the coefficient addition unit 84, the target temperature output unit 85, the difference comparison unit 86, the control duty generation unit 87, the external limit unit 88, and the duty pulse conversion unit 89 perform processing based on the input signals, and the duty pulse conversion unit 89 outputs the energization pulse Ps at the time t (n+1).

At time t(n+2), the temperature detection result Td newly detected at time t(n+2), the duty value LD at time t(n+1), and the estimation history PREV which is the temperature estimation result EST at time t(n+1) are input to the temperature estimation unit 81. The temperature estimation unit 81 performs processing based on the input signal and outputs the temperature estimation result EST at time t(n+2). The high frequency component extraction unit 83, the coefficient addition unit 84, the target temperature output unit 85, the difference comparison unit 86, the control duty generation unit 87, the external limit unit 88, and the duty pulse conversion unit 89 perform processing based on the input signals, and the duty pulse conversion unit 89 outputs the energization pulse Ps at the time t(n+2).

Note that the above-described time interval dt may be a fixed value or may be configured to be set in initial value setting. For example, the time interval dt is set at 100 [msec].

The target temperature TGT according to the status of the printing process will be described.

Figure 8:
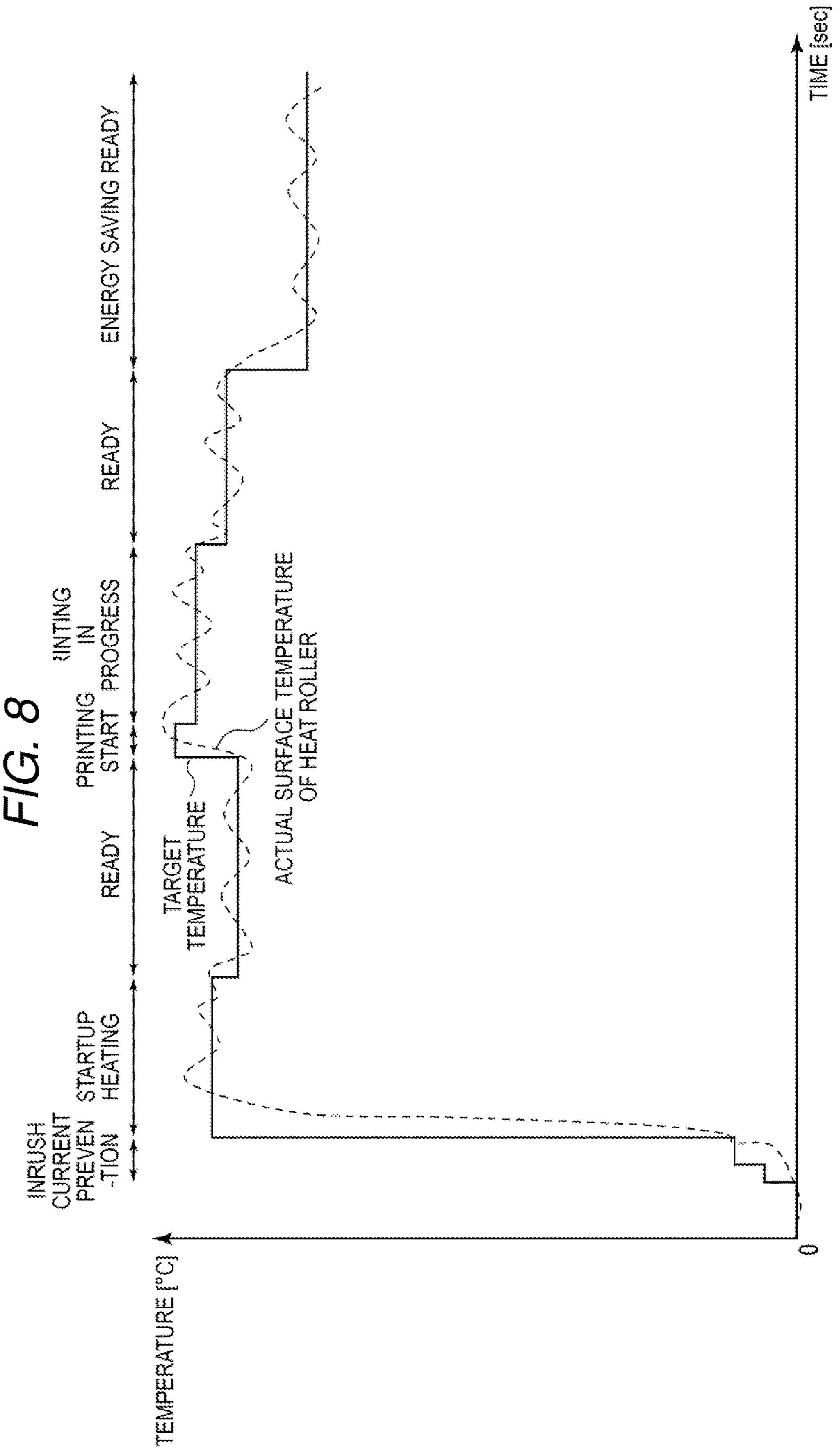
FIG. 8 is a diagram illustrating an example of target temperature.

FIG. 8 is an explanatory diagram illustrating an example of the target temperature TGT according to the status of the printing process.

The horizontal axis of FIG. 8 indicates time. The vertical axis in FIG. 8 indicates temperature. A solid line indicates the target temperature TGT. A dashed line indicates the actual surface temperature of the heat roller 71.

A status of the printing process includes various statuses related to the printing process. For example, the status of the printing process includes inrush current prevention, startup heating, ready, printing start, printing in progress, energy saving ready, and the like, but not limited thereto. The target temperatures TGT for the respective statuses are different from each other. The target temperatures TGT for the respective statuses may be determined in advance or may be variable.

In the status of the inrush current prevention, the target temperature TGT is set to increase step by step so that the large current does not suddenly flow. In the status of the startup heating, the target temperature TGT is set high to quickly reach a reference temperature suitable for printing. In the status of ready, the target temperature TGT is set to be slightly lower than the target temperature TGT in the status of the startup heating to save energy after printing is ready. In the status of the printing start, the target temperature TGT is set to be higher than the target temperature TGT in the status of the printing-in-progress from the little before printing so that the temperature does not drop at the beginning of printing. In the status of the printing-in-progress, the target temperature TGT is set to the reference temperature suitable for printing. In the status of the energy saving ready, if ready continues for the long time, the target temperature TGT is set to be lower than the target temperature TGT in the status of ready.

The relationship between the difference DIF and the duty value DUTY will be described.

Figure 9:
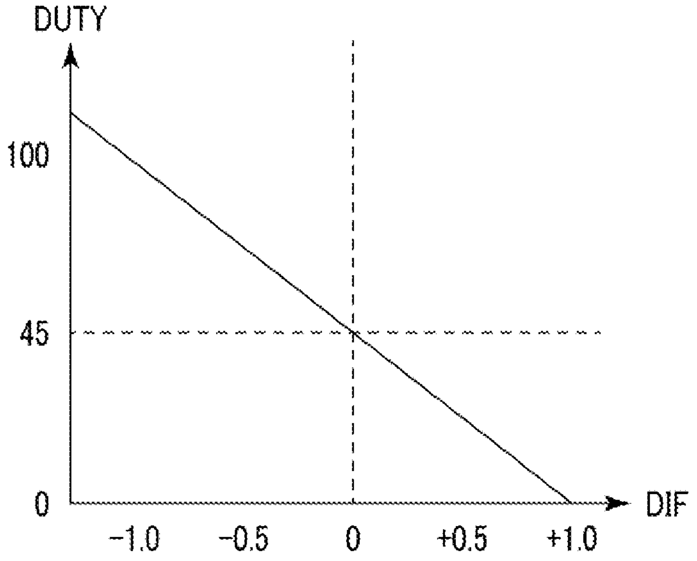
FIG. 9 is a diagram illustrating a relationship between a difference DIF and a duty value DUTY.

FIG. 9 is a diagram illustrating the relationship between the difference DIF and the duty value DUTY.

The horizontal axis of FIG. 9 indicates the difference DIF. The vertical axis in FIG. 9 indicates the duty value DUTY. The solid line indicates the relationship between the difference DIF and the duty value DUTY.

Herein, the center value of the duty which is the duty value DUTY if the difference DIF is 0 is assumed to be set to 45%. The maximum value of the difference DIF is assumed to be set to 1, and the minimum value of the difference DIF is assumed to be set to −1. The duty value DUTY is assumed to be set to 0 if the difference DIF is the maximum value. The duty value DUTY is assumed to be set to 100 if the difference DIF is the minimum value. The relationship between the difference DIF and the duty value DUTY is assumed to be expressed as a linear function based on the above-described settings. In the present example, it is duty value DUTY=45−difference DIF*slope (45/1).

If the corrected temperature value WAE is lower than the target temperature TGT, the duty value DUTY is a value higher than the center value of the duty. On the other hand, if the corrected temperature value WAE is higher than the target temperature TGT, the duty value DUTY is a value lower than the center value of the duty. The control duty generation unit 87 generates the duty value DUTY based on the difference DIF for each processing cycle by using the relationship between the difference DIF and the duty value DUTY illustrated in FIG. 9.

The energization pulse train generated by the duty pulse conversion unit 89 will be described.

Figure 10:
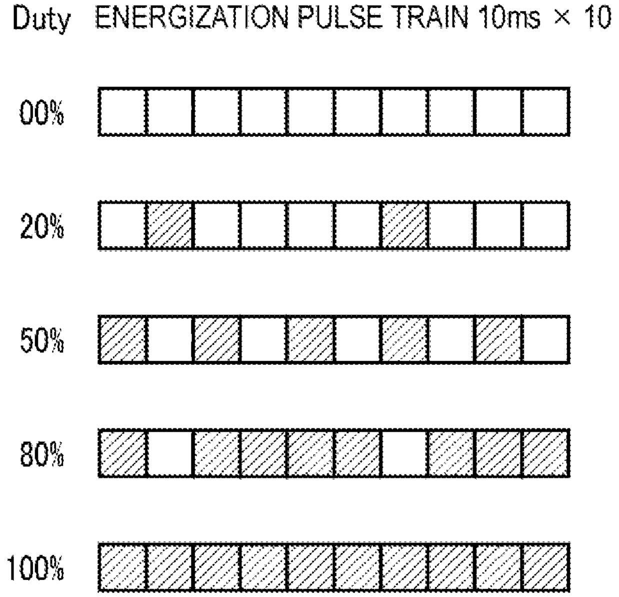
FIG. 10 is a diagram illustrating an energization pulse train generated by the heater energization control circuit.

FIG. 10 is a diagram illustrating the energization pulse train generated by the duty pulse conversion unit 89.

Herein, the energization pulse train is assumed to be represented by 10 pulses. One pulse is assumed to be 10 ms. Each square indicates one pulse. The hatched squares are energization pulses Ps indicating "1" of the conduction (ON) signal. The white square indicates "0" of the cutoff (OFF) signal. If the duty DUTY is 0%, the ten squares indicating the energization pulse train are all white squares. Therefore, the energization pulse train of 100 ms is a signal of "0" for 100% of 100 ms. If the duty DUTY is 20%, the ten squares indicating the energization pulse train include two hatched squares. Therefore, the energization pulse train of 100 ms has a signal of "1" for 20% of 100 ms and a signal of "0" for 80% of 100 ms. If the duty DUTY is 50%, the ten squares indicating the energization pulse train include five hatched squares. Therefore, the energization pulse train of 100 ms is a signal of "1" for 50% of 100 ms and a signal of "0" for 50% of 100 ms. If the duty DUTY is 50%, the ten squares indicating the energization pulse train include eight hatched squares. Therefore, the energization pulse train of 100 ms is a signal of "1" for 80% of 100 ms and a signal of "0" for 20% of 100 ms. If the duty DUTY is 100%, the ten squares indicating the energization pulse train are all hatched squares. Therefore, the energization pulse train of 100 ms is a signal of "1" for 100% of 100 ms.

The relationship between the duty value and the generated power and the relationship between the energization pulse train and the generated power will be described.

Figure 11:
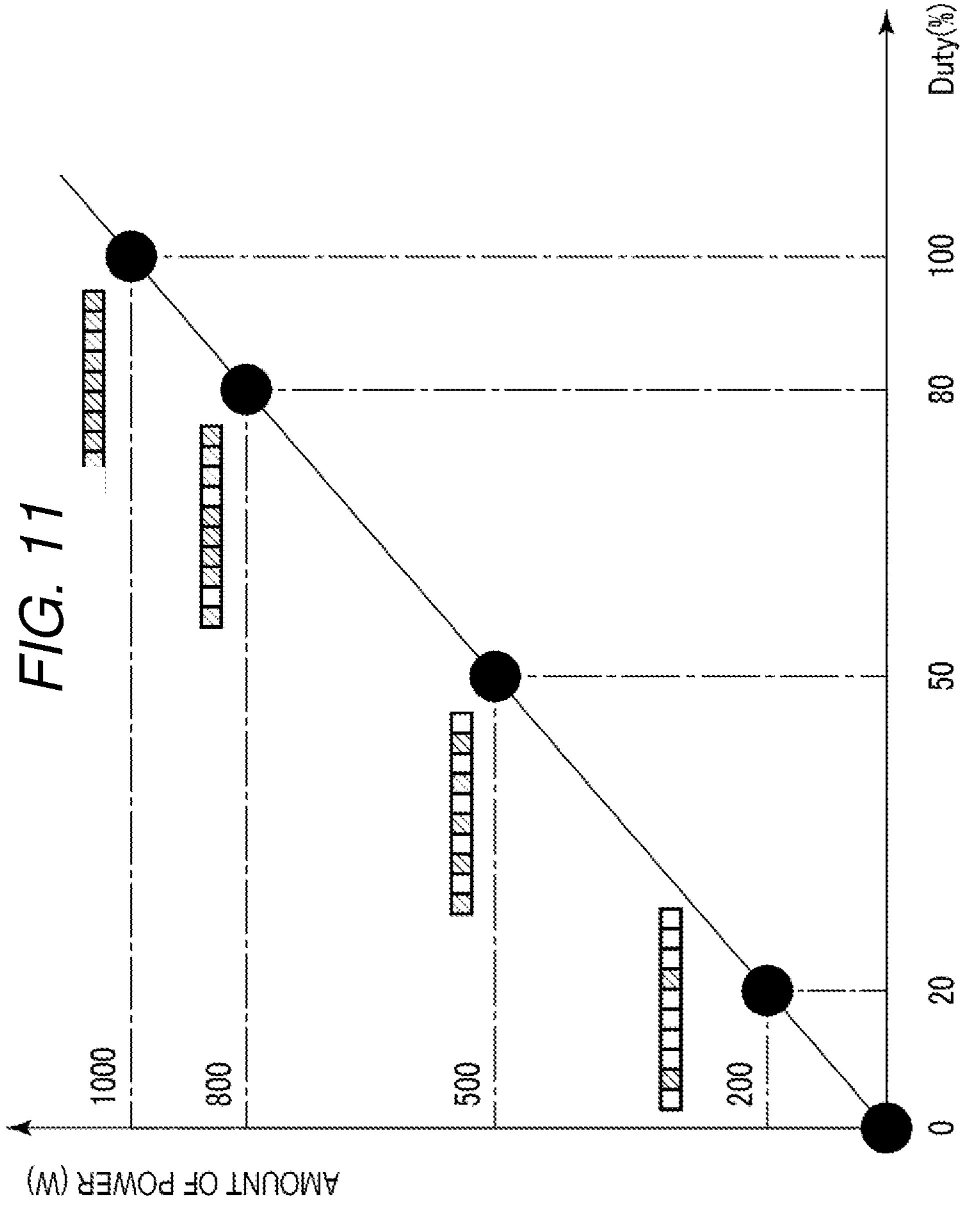
FIG. 11 is a diagram illustrating a relationship between a duty value and generated power and a relationship between an energization pulse train and generated power.

FIG. 11 is a diagram illustrating the relationship between the duty value and the generated power and the relationship between the energization pulse train and the generated power.

The horizontal axis of FIG. 11 indicates the duty value. The vertical axis in FIG. 11 indicates the amount of power.

According to the relationship between the duty value and the generated power and the relationship between the pulse train and the generated power, it can be seen that the duty value and the pulse train have a proportional relationship. Note that the resistance value of the heat roller 71 is set to be constant. If the resistance value of the heat roller 71 changes, the relationship between the duty value and the electric energy may be corrected by using the table. Even then, the relationship between the duty value and the pulse train is a proportional relationship. Therefore, it can be seen that the duty value can be used instead of the energization pulse Ps for the temperature estimation unit 81 to generate the temperature estimation result EST.

The example of duty value sampling will be described.

Figure 12:
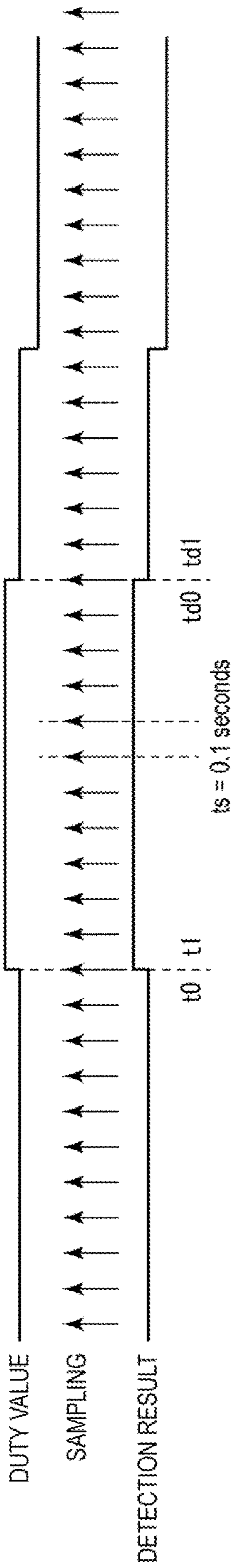
FIG. 12 is a diagram illustrating a sampling example of duty values.

FIG. 12 is a diagram illustrating an example of the duty value sampling according to an embodiment.

As can be seen from the comparison between the duty value indicated by the duty value LD illustrated in FIG. 12 and the duty value detection result, the processor uses the self-generated duty value, so that the duty value is detected without delay. As can be seen from the sampling intervals illustrated in FIG. 12, since the processor uses self-generated duty values, the processor does not require high speed sampling.

Next, the WAE control described above will be described by using specific numerical examples.

The parameters corresponding to the V, C, and R elements constituting the thermal circuit illustrated in FIG. 3 are as follows.

The heat source V1 is 500+273 (Kelvin). The outside air temperature V2 is 25+273 (Kelvin). The heating resistance R1 is assumed to be set to be 10 (Ω). The heat dissipation resistance R2 is 2 (Ω). The outside air resistance R3 is 5 (Ω). The heater capacitance C1 is 10 (F). The unit capacitance C2 is 100 (F).

Here, each value in the WAE control is as follows.

The temperature estimation result EST is 126+273 (Kelvin). The temperature detection result Td is 115+273 (Kelvin). The high frequency component HPF is 5 (Kelvin). The coefficient K is 1. The corrected temperature value WAE is Td+K*HPF=115+273+5*1. The target temperature TGT is 118+273 (Kelvin). The differential DIF is WAE−TGT=2. The duty value DUTY is 48. The duty value LD is 50 if the energization pulse train is represented by 10 pulses. Here, the energization pulses Ps include 5 out of 10 pulses representing the energization pulse train. If the energization pulse train is represented by 100 pulses, the duty value LD is 48. In this case, 48 of 100 pulses representing the energization pulse train are energization pulses Ps.

Note that the temperature estimation unit 81 may take AC voltage fluctuations into consideration.

If the AC voltage is 100 V, E1 is 400, and R1 is 100Ω. Note that the duty value indicated by the duty value LD is 100%. Here, the input power is E1×E1/R1=1600 (Watt).

If the AC voltage is 110 V, E1 is 400*110/100=440, and R1 is 100Ω. Note that the duty value indicated by the duty value LD is assumed to be 100%. Here, the input power is E1*E1/R1=1936 (Watt).

If the AC voltage is 90 V, E1 is assumed to be 400*90/100=360, and R1 is assumed to be 100Ω. Note that the duty value indicated by the duty value LD is assumed to be 100%. Here, the input power is E1*E1/R1=1296 (Watt).

As described above, the image forming apparatus 1 includes the fixing device 21 having the heat roller 71 heating the toner image formed on the print medium P to fix the toner image on the print medium P, the heater 73 heating the heat roller 71, and the temperature control device (heater energization control circuit 14). The heater energization control circuit 14 controls the temperature of the heat roller 71 to which heat is propagated from the heater 73 by supplying power to the heater 73. The heater energization control circuit 14 includes the temperature estimation unit 81 estimating the temperature of the heat roller 71. The heater energization control circuit 14 includes the control duty generation unit 87 generating the duty value DUTY based on the temperature estimation result EST by the temperature estimation unit 81, the temperature detection result Td of the heat roller 71 by the temperature sensor 74, and the target temperature TGT. The heater energization control circuit 14 includes the duty pulse conversion unit 89 outputting the energization pulse Ps for controlling the power supplied to the heater 73 based on the duty value DUTY. The temperature estimation unit 81 estimates the temperature of the heat roller 71 based on the duty value DUTY.

The temperature estimation unit 81 estimates the temperature of the heat roller 71 based on the history of the temperature estimation results EST and the duty value DUTY.

The control duty generation unit 87 calculates the duty value DUTY based on the difference DIF between the target temperature TGT and the corrected temperature value WAE based on the temperature estimation result EST and the temperature detection result Td.

According to such a configuration, the temperature control device can realize simple feedback control effective for the WAE control and speed up the feedback control. The temperature control device enables highly accurate temperature control through the WAE control and effective feedback control for the WAE control. Accordingly, the temperature control device can reduce cost of the temperature sensor 74 and prevent temperature ripples and the like from occurring. Since the temperature control device estimates the temperature of the heat roller 71 based on the duty value DUTY, even if the frequency of the energization pulse is high, there is no need for a mechanism for detecting a change in the pulse. Therefore, since the temperature control device does not require high speed sampling, an increase in processing load can be prevented. Accordingly, the temperature control device can be realized with an inexpensive processor. The temperature control device can be easily implemented in firmware.

The heater energization control circuit 14 includes the external limit unit 88 limiting the duty value DUTY. The duty pulse conversion unit 89 outputs the energization pulse Ps based on the duty value after limitation by the external limit unit 88. The temperature estimation unit 81 estimates the temperature of the heat roller 71 based on the duty value after the limitation.

According to such a configuration, the temperature control device can avoid danger to the image forming apparatus 1 by limiting the duty value DUTY.

Note that the temperature control device described above is not limited to being applied to the image forming apparatus 1. The temperature control device can be employed to various devices that use heat. For example, the temperature control device can be employed to copy machines, multi-function machines, or printers melting toner by heat. The temperature control device can be employed to a furnace in which temperature is maintained constant or changed gradually and a single crystal material manufacturing machine in which a crystal is pulled up from a melting furnace and grown. The temperature control device can be employed to color thermal printers changing colors depending on temperature. The temperature control device can be employed to melting furnaces producing alloys. In a case of a copy machine or a color thermal printer, a printing quality can be expected to be improved such that printing is clear and the color does not change over time even if a large amount of printing is performed. With respect to melting furnaces, since temperature can be controlled accurately, it is expected to improve a yield of manufactured products, improve crystal quality (decrease in crystal defect ratio), and improve performance of alloys.

Note that the functions described in each of the above-described embodiments can be implemented not only by using hardware, but also by causing a computer to read a program describing each function by using software. Each function may be configured by selecting either software or hardware as appropriate.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A temperature control device, comprising:

a temperature estimation component configured to estimate a temperature of a temperature controlled target of a temperature controlled target to which heat is propagated by supplying power to a heater;

a duty generation component configured to generate a duty value based on a temperature estimation result by the temperature estimation component, a temperature detection result of the temperature controlled target by a temperature sensor, and a target temperature; and a signal generation component configured to output an energization pulse to control the power supplied to the heater based on the duty value, wherein the temperature estimation component is further configured to estimate the temperature of the temperature controlled target based on the duty value.

2. The temperature control device according to claim 1, wherein the temperature estimation component estimates the temperature of the temperature controlled target based on a history of the temperature estimation result and the duty value.

3. The temperature control device according to claim 1, further comprising a limit component configured to limit the duty value, wherein the signal generation component outputs the energization pulse based on the duty value after limitation by the limit component, and the temperature estimation component estimates the temperature of the temperature controlled target based on the duty value after the limitation.

4. The temperature control device according to claim 1, wherein the duty generation component calculates the duty value based on a difference between the target temperature and a corrected temperature value based on the temperature estimation result and the temperature detection result.

5. The temperature control device according to claim 1, wherein the temperature estimation component estimates a surface temperature of a heat roller.

6. The temperature control device according to claim 1, further comprising a difference comparison component configured to perform a difference calculation process.

7. The temperature control device according to claim 6, wherein the difference calculation process involves comparing the target temperature and a corrected temperature value.

8. An image forming apparatus, comprising:

a fixing device having a fixing rotator configured to heat a toner image formed on a medium to fix the toner image on the medium; and a heater configured to heat the fixing rotator; and a temperature controller configured to control a temperature of the fixing rotator to which heat is propagated by supplying power to the heater, wherein the temperature controller includes a temperature estimation component configured to estimate the temperature of the fixing rotator, a duty generation component configured to generate a duty value based on a temperature estimation result by the temperature estimation component, a temperature detection result of the fixing rotator by a temperature sensor, and target temperature, and a signal generation component configured to output an energization pulse to control the power supplied to the heater based on the duty value, and the temperature estimation component configured to estimate the temperature of the fixing rotator based on the duty value.

9. The image forming apparatus according to claim 8, wherein the temperature estimation component estimates the temperature of the temperature controlled target based on a history of the temperature estimation result and the duty value.

10. The image forming apparatus according to claim 8, further comprising a limit component configured to limit the duty value, wherein the signal generation component outputs the energization pulse based on the duty value after limitation by the limit component, and the temperature estimation component estimates the temperature of the temperature controlled target based on the duty value after the limitation.

11. The image forming apparatus according to claim 8, wherein the duty generation component calculates the duty value based on a difference between the target temperature and a corrected temperature value based on the temperature estimation result and the temperature detection result.

12. The image forming apparatus according to claim 8, wherein the temperature estimation component estimates a surface temperature of a heat roller.

13. The image forming apparatus according to claim 8, further comprising a difference comparison component configured to perform a difference calculation process.

14. The image forming apparatus according to claim 13, wherein the difference calculation process involves comparing the target temperature and a corrected temperature value.

15. A temperature control method, comprising:

supplying power to a heater to change a temperature of a temperature controlled target;

estimating the temperature of the temperature controlled target;

generating a duty value based on a temperature estimation result, a temperature detection result of the temperature controlled target by a temperature sensor, and a target temperature;

outputting an energization pulse for controlling the power supplied to the heater based on the duty value; and estimating the temperature of the temperature controlled target based on the duty value.

16. The temperature control method according to claim 15, wherein estimating the temperature of the temperature controlled target is based on a history of the temperature estimation result and the duty value.

17. The temperature control method according to claim 15, further comprising:

limiting the duty value;

outputting the energization pulse based on the duty value after limitation; and estimating the temperature of the temperature controlled target based on the duty value after limitation.

18. The temperature control method according to claim 15, wherein calculating the duty value based on a difference between the target temperature and a corrected temperature value is based on the temperature estimation result and the temperature detection result.

19. The temperature control method according to claim 15, further comprising calculating the duty value based on a difference between the target temperature and a corrected temperature value based on the temperature estimation result and the temperature detection result.

20. The temperature control method according to claim 15, further comprising estimating a surface temperature of a heat roller.

* * * * *